United States Patent
Yaskoff et al.

(10) Patent No.: US 12,015,511 B1
(45) Date of Patent: Jun. 18, 2024

(54) RADIO FREQUENCY (RF) COMMUNICATIONS SYSTEM HAVING RF NODES THAT DETERMINE A DESPREADING SEQUENCE AND PHASE AND TIMING OFFSETS FOR FREQUENCY AGILITY

(71) Applicant: L3HARRIS TECHNOLOGIES, INC., Melbourne, FL (US)

(72) Inventors: Nicholas T. Yaskoff, Park City, UT (US); Marc A. Padilla, Farmington, UT (US); David M. Arnesen, West Jordan, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 18/060,612

(22) Filed: Dec. 1, 2022

(51) Int. Cl.
*H04B 1/69* (2011.01)
*H04B 1/707* (2011.01)
*H04B 1/7087* (2011.01)
*H04B 1/709* (2011.01)
*H04B 1/713* (2011.01)
*H04L 5/00* (2006.01)
*H04L 27/227* (2006.01)

(52) U.S. Cl.
CPC ....... *H04L 27/2278* (2013.01); *H04B 1/7087* (2013.01); *H04B 1/709* (2013.01); *H04L 5/0048* (2013.01)

(58) Field of Classification Search
CPC ... H04L 27/2278; H04B 1/7087; H04B 1/709; H04B 1/7075; H04B 1/707; H04W 56/001
USPC ........ 375/142, 143, 144, 148–150, 152, 343
See application file for complete search history.

(56) References Cited

U.S. PATENT DOCUMENTS

| | | | |
|---|---|---|---|
| 7,310,368 B2 | 12/2007 | Yu et al. | |
| 7,701,996 B1* | 4/2010 | Giallorenzi | .......... H04B 1/7075 370/335 |
| 8,594,151 B2* | 11/2013 | Charbit | ............... H04L 27/2655 375/148 |
| 9,130,689 B1 | 9/2015 | Giallorenzi et al. | |
| 2008/0095108 A1* | 4/2008 | Malladi | ............... H04W 56/001 370/329 |
| 2010/0215127 A1* | 8/2010 | Dehmas | ................. H04B 1/707 375/326 |
| 2015/0341078 A1* | 11/2015 | Lingam | ................... H04L 23/00 375/149 |
| 2020/0236607 A1 | 7/2020 | Zhu et al. | |

* cited by examiner

*Primary Examiner* — Phuong Phu
(74) *Attorney, Agent, or Firm* — ALLEN, DYER, DOPPELT, + GILCHRIST, P.A.

(57) ABSTRACT

A radio frequency (RF) communications system may include a first RF node that transmits data, including a new frequency of operation, and a sequence of pilot symbols spread with a complex spreading code sequence. A second RF node may receive an incoming signal from the first RF node and perform despreading for N sample offset delays to generate N despreading sequences for the sequence of pilot symbols. The second RF node may perform a cross-correlation to select a desired despreading sequence from the N despreading sequences, determine a phase offset and timing offset, process the incoming signal based upon the desired despreading sequence, phase offset and timing offset, and switch to the new frequency of operation.

31 Claims, 6 Drawing Sheets

RADIO FREQUENCY (RF) COMMUNICATIONS SYSTEM HAVING RF NODES THAT DETERMINE A DESPREADING SEQUENCE AND PHASE AND TIMING OFFSETS FOR FREQUENCY AGILITY

FIELD OF THE INVENTION

The present invention relates to the field of communications systems, and, more particularly, to a radio frequency (RF) communications system that transmits data and a sequence of pilot symbols spread with a complex spreading code sequence and related methods.

BACKGROUND OF THE INVENTION

A common technique to protect radio frequency (RF) communications from interference, fading, jamming, and other sources of signal interference is to spread the transmitted signal over a bandwidth that is much larger than the underlying symbol rate. Conventional techniques of spreading RF communications signals include frequency hopping and direct sequence spread spectrum communications. In some RF communications systems, direct sequence spread spectrum is the preferred signal spreading technique because there are fewer signal variations over time as compared to a frequency hopping spread spectrum scheme. In a resilient communications environment using one of these signal spreading techniques, such as a mesh or ad-hoc communications network, the levels of signal interference often change, thus requiring an RF node in the communications network to have the capability to reacquire quick access to the network if a communications connection had been lost or the network configuration changed.

Depending on the signal interference levels, different RF nodes in the network may need to shift their transmitted signals to a different frequency in a more advantageous part of the communications band to maintain existing communication links, or allow other RF nodes to reacquire the communications signal. This frequency change in communications differs from conventional frequency hopping spread spectrum because the RF nodes are not changing frequency in a predetermined or deterministic pattern.

Additionally, the transmitted signal bandwidth may widen or narrow at the same time for more optimal network performance. In this changing network environment, acquisition of a direct sequence spread spectrum communications link with a varying frequency and bandwidth is sometimes difficult, and a secondary acquisition channel, i.e., a control channel having a fixed bandwidth and location, is sometimes employed.

When the acquisition channel and the data channel share the same frequency, for example, in some code division multiplexing schemes, the chip rate and carrier phase are known. The acquisition channel provides data relating to transmission security (TRANSEC), and the data used to identify the chip timing and start of the data channel is transmitted in pilot symbols that may be included in a header. These approaches may include a break-before-make technique, where the current communication links are interrupted, and a new acquisition signal is transmitted over the acquisition channel to allow remote RF nodes to reestablish network communication.

However, the delay in the receiving acquisition data being transmitted on the acquisition channel may be long, such as one to four seconds, which hinders reacquisition. This delay may be due to the time required in changing the center frequency, pausing the data transmission at the transmitting RF node to break the existing communications links, sending the acquisition signal, and then waiting for the second RF node to reacquire the data signal to resume normal network communications. For that reason, there may be significant data loss due to this delay.

SUMMARY OF THE INVENTION

In general, a radio frequency (RF) communications system may comprise a first RF node configured to transmit data, including a new frequency of operation, and transmit a sequence of pilot symbols spread with a complex spreading code sequence. A second RF node may be configured to receive an incoming signal from the first RF node comprising at least the sequence of pilot symbols, perform despreading for N sample offset delays to generate N despreading sequences for the sequence of pilot symbols, perform a cross-correlation to select a desired despreading sequence from the N despreading sequences, and determine a phase offset and timing offset, process the incoming signal based upon the desired despreading sequence, phase offset and timing offset, and switch to the new frequency of operation.

The first RF node may be configured to transmit the new frequency of operation in a header. The incoming signal may comprise a complex baseband data stream including the sequence of pilot symbols spread with a complex spreading code sequence. The desired despreading sequence may be a strongest despreading sequence from among the N despreading sequences. The second RF node may be configured to compare the strongest despreading sequence to a threshold and indicate a synchronization found if above the threshold.

A starting position of the sequence of pilot symbols may be within N samples. The second RF node may comprise a plurality of data delay blocks, a plurality of multipliers downstream from the plurality of data delay blocks, and a plurality of accumulators downstream from the plurality of multipliers. The second RF node may comprise a pilot symbol correlator downstream from the plurality of accumulators. The pilot symbol correlator may be configured to perform cross-correlation on N symbol sequences and determine a maximum magnitude among the N symbol sequences, and when this maximum is above a threshold, the pilot symbol correlator signals that the codes sequence was found.

In an example, at least one other RF node may define a mesh network. In another example, the first and second RF nodes may define a point-to-point communication link. The first RF node may be configured to transmit the sequence of pilot symbols at an acquisition channel frequency different than a data channel frequency for the data.

Another aspect is directed to a method of radio frequency (RF) communications that may comprise operating a first RF node to transmit data, including a new frequency of operation, and transmit a sequence of pilot symbols spread with a complex spreading code sequence. The method further includes operating a second RF node to receive an incoming signal from the first RF node comprising at least the sequence of pilot symbols, perform despreading for N sample offset delays to generate N despreading sequences for the sequence of pilot symbols, perform a cross-correlation to select a desired despreading sequence from the N despreading sequences, and determine a phase offset and timing offset, process the incoming signal based upon the desired despreading sequence, phase offset and timing offset, and switch to the new frequency of operation.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

The present description is made with reference to the accompanying drawings, in which exemplary embodiments are shown. However, many different embodiments may be used, and thus, the description should not be construed as limited to the particular embodiments set forth herein. Rather, these embodiments are provided so that this disclosure will be thorough and complete. Like numbers refer to like elements throughout.

Figure 1:
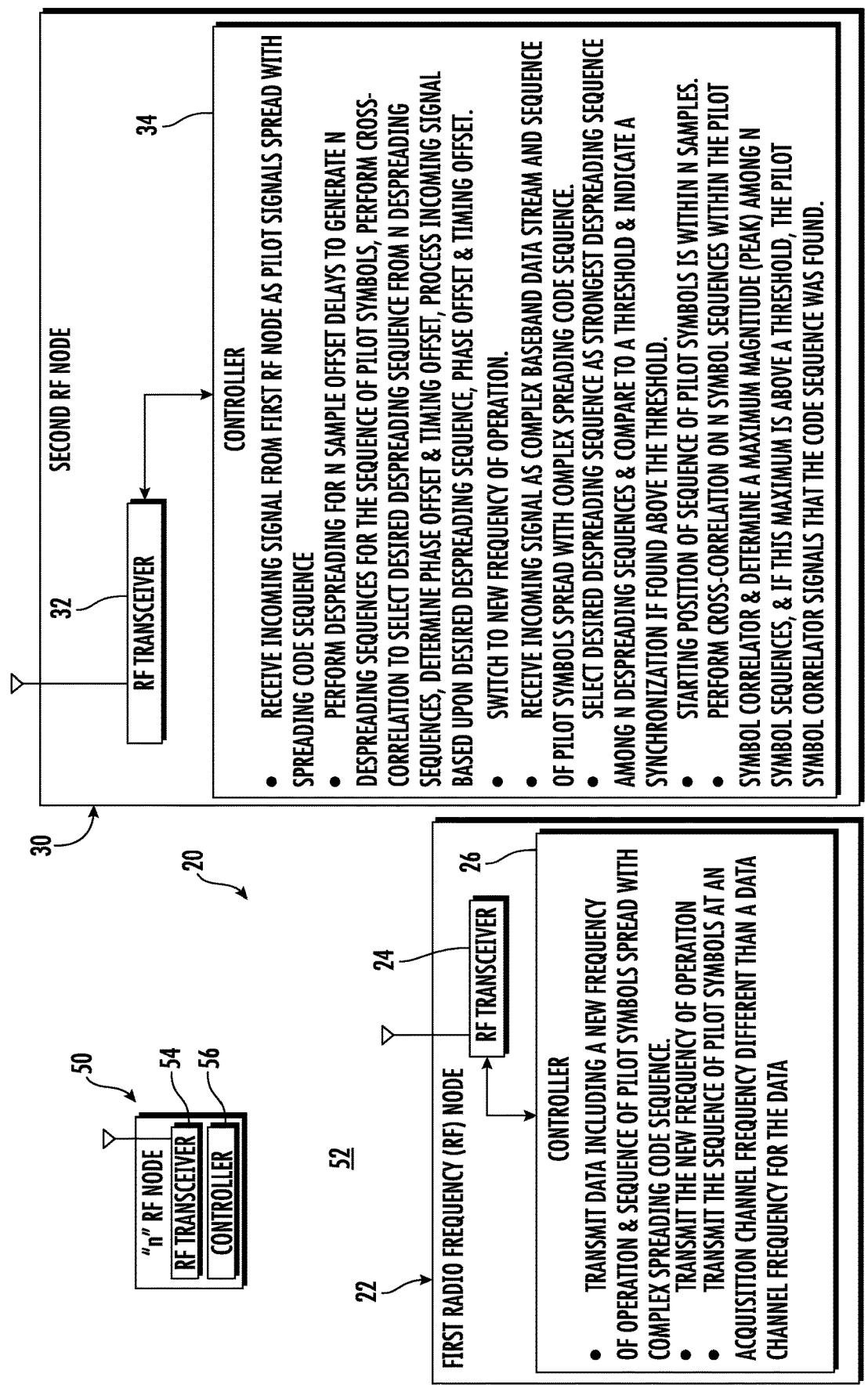
FIG. 1 is a high-level block diagram of the RF communications system showing RF nodes that determine a despreading sequence and phase and timing offsets from pilot symbols in accordance with a non-limiting example.

Referring initially to FIG. 1, a radio frequency (RF) communications system is illustrated generally at 20, and shows a first RF node 22 that includes a first RF transceiver 24 and a first controller 26 coupled thereto. This first RF node 22 is configured to transmit data, including a new frequency of operation, and transmit a sequence of pilot symbols spread with a complex spreading code sequence. A second RF node 30 includes a second RF transceiver 32 and second controller 34 coupled thereto.

The second RF node 30 is configured to receive an incoming signal from the first RF node 22 comprising at least the sequence of pilot symbols, and perform despreading for N sample offset delays to generate N despreading sequences for the sequence of pilot symbols. The second RF node 30 performs a cross-correlation to select a desired despreading sequence from the N despreading sequences and determine a phase offset and timing offset. The second controller 34 at the second RF node 30 processes the incoming signal based upon the desired despreading sequence, phase offset, and timing offset, and switches to the new frequency of operation.

The first RF node 22 is configured to transmit the new frequency of operation in a header. In an example, the incoming signal may be formed as a complex baseband data stream, including the sequence of pilot symbols spread with a complex spreading code sequence. A desired despreading sequence in an example is a strongest despreading sequence from among the N despreading sequences. The second RF node 30 via its second controller 34 is configured to compare the strongest despreading sequence to a threshold and indicate a synchronization is found when above the threshold. It is also possible that a plurality of the N despreading sequence may be used to create a threshold and decode path. It is possible to use a weighted sum of the N despread paths, similar in example to a RAKE receiver. In this example, the starting position of the sequence of pilot signals may be within N samples.

As will be explained in greater detail below, the second RF node 30 may include a plurality of data delay blocks 40 (FIG. 5) and a plurality of multipliers 42 downstream from the plurality of data delay blocks. A plurality of symbol accumulators 44 are downstream from the plurality of multipliers 42. It is also possible to have a similar architecture using a frequency domain circuit. A pilot symbol correlator 46 is downstream from the plurality of symbol accumulators 44. In a non-limiting example, the pilot symbol correlator 46 is configured to perform cross-correlation on N symbol sequences and look for the maximum magnitude corresponding to the peak among the N symbol sequences, and if this maximum is above a threshold, the pilot symbol correlator indicates that the code sequence was found.

As shown by the "n" RF node at 50 in FIG. 1, at least one other RF node may define a mesh network as illustrated at 52. This "n" RF node 50 includes a "n" RF transceiver 54 and controller 56 coupled thereto and having similar functions to the first and second RF transceivers 24, 32 and controllers 26, 34 at the first and second RF nodes 22, 30. In another example, the first and second RF nodes 22, 30 may define a point-to-point communications link. The first RF node 22 may be configured to transmit the sequence of pilot symbols at an acquisition channel frequency different than a data channel frequency for the data. For example, the acquisition channel frequency could correspond to a frequency adjacent the data channel.

Figure 2:
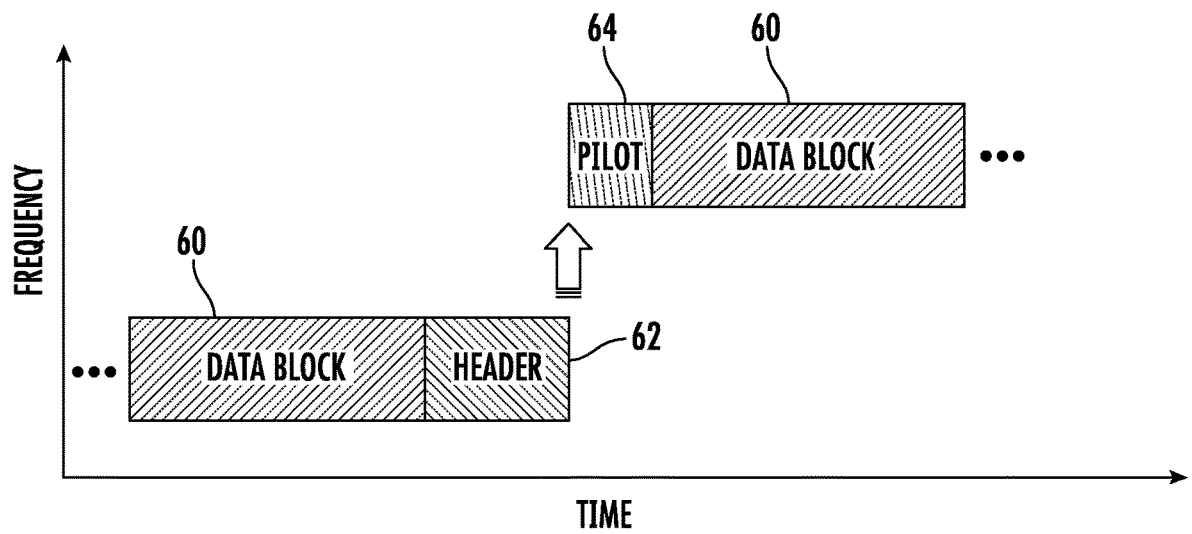
FIG. 2 is a graph showing a header block and data block that are transmitted to identify to an RF node a new frequency of operation in the RF communications system of FIG. 1.

Referring now to FIG. 2, there is illustrated a graph of an example of the RF signal transmitted from the first RF node 22 showing the data block 60 and its header block 62 transmitted on a first frequency, and after switching to a new frequency, a sequence of pilot symbols 64 is spread with a complex spreading code sequence and inserted as a header in front of the next data block. This first RF node 22 transmits a header block 62 with the data block 60 at the first frequency. The header block 62 specifies the parameters for a frequency change to all receiving RF nodes, such as the second RF node 30 and "n" RF nodes 50. As shown by the horizontal time axis, the frequency change is made after the header block completion 62, and the pilot symbols 64 are inserted before the next data block to allow an RF node, such as the second RF node 30, to regain synchronization and lock back onto the communications signal. There is a small additional overhead due to the insertion of the pilot symbols 64 before the next data block 60 at the new frequency of operation.

Figure 3:
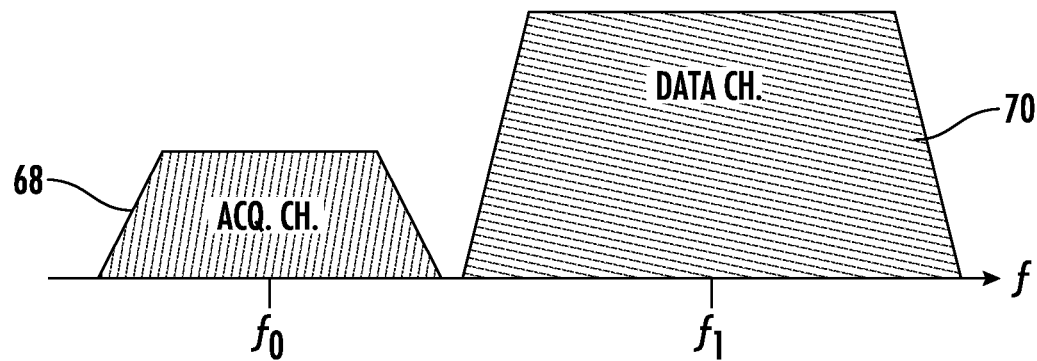
FIG. 3 is a schematic diagram showing an acquisition channel adjacent in frequency to the data channel as employed in the RF communications system of FIG. 1.
Figure 4:
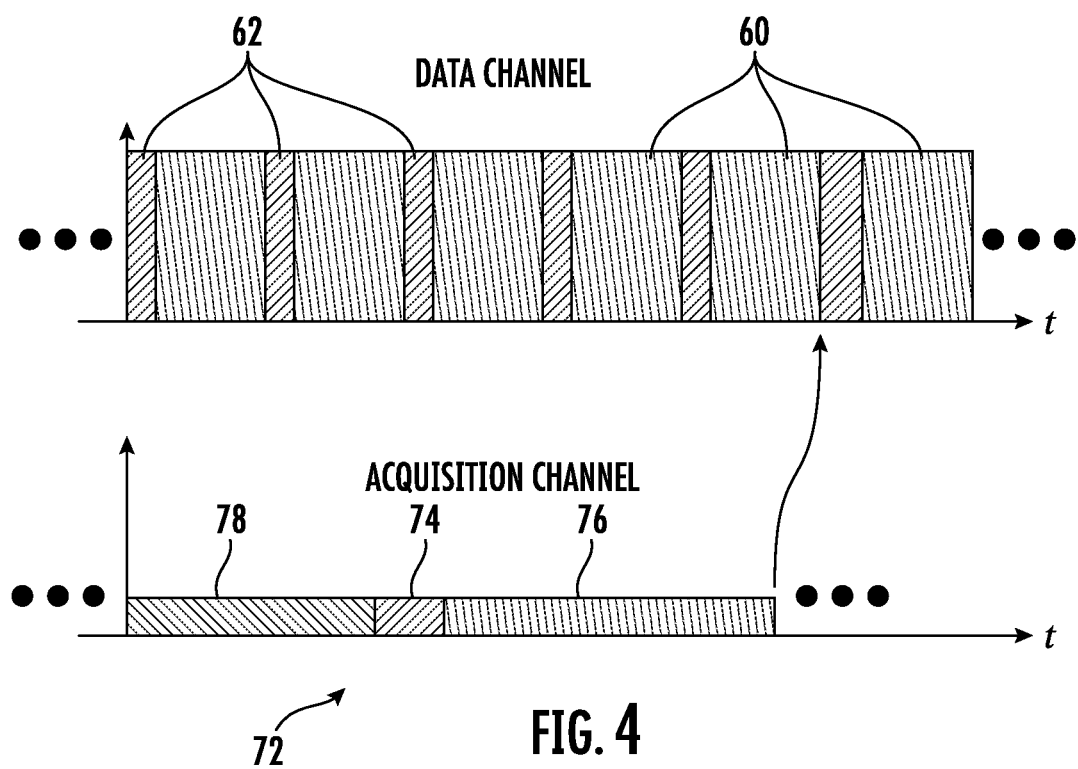
FIG. 4 is a schematic diagram showing the data channel and the acquisition channel in the time domain.

Referring now to FIGS. 3 and 4, there are illustrated diagrams showing how the first RF node 22 may transmit the sequence of pilot symbols 64 on an acquisition channel 68 at a frequency different than the data channel 70 for the data block 60, as shown by the separate frequency $f_0$ for the acquisition channel (FIG. 3), and in this example, the data channel 70 at frequency $f_1$ adjacent the acquisition channel 68. As illustrated in FIG. 4, the data channel 70 may include a plurality of header blocks 62 and a respective data block 60 following each header block 62. The acquisition channel 68 may include an acquisition block 72 that acquires synchronization at the second and "n" RF nodes 30, 50 when transmitted by the first RF node 22.

This acquisition block 22 may be transmitted at a rate slower than a transmission rate of a respective header block 62 at the data channel 70 with its respective data block 60 following each header block. For example, the acquisition block 72 may include a header 74, payload 76 and preamble 78. Other information may be transmitted on the acquisition channel 68 either as separate data or as part of the acquisition block and may include a ratio between the acquisition channel 68 chip rate and the data channel 70 chip rate and the carrier frequency of the data channel.

Referring again to FIG. 5, there is illustrated a block diagram of the functional components at an RF node, such as the second RF node 30, which receives the incoming signal transmitted from the first RF node 22, performs the despreading for N sample offset delays to generate N despreading sequences for the sequence of pilot symbols, performs the cross-correlation to select a desired despreading sequence from the N despreading sequences, determines a phase offset and timing offset, and processes the incoming signal based upon the desired despreading sequence, phase offset and timing offset.

As illustrated, the signal input corresponding to the pilot symbols is sampled as a sample input at 80 and input to the plurality of data delay blocks 40 followed by the signal processing at the plurality of multipliers 42 downstream from the plurality of data delay blocks, which receive a complex PN code from a code generator circuit 82. After mixing in the multipliers 42, the plurality of symbol accumulators 44 downstream from the plurality of multipliers 42 receive and accumulate the mixed symbols. The pilot symbol correlator 46 performs the cross-correlation on N symbol sequences after symbols are accumulated and looks for a maximum magnitude as the peak among the N symbol sequences, and if this maximum is above some threshold, the pilot symbol correlator 46 signals that the code sequence was found.

Figure 5:
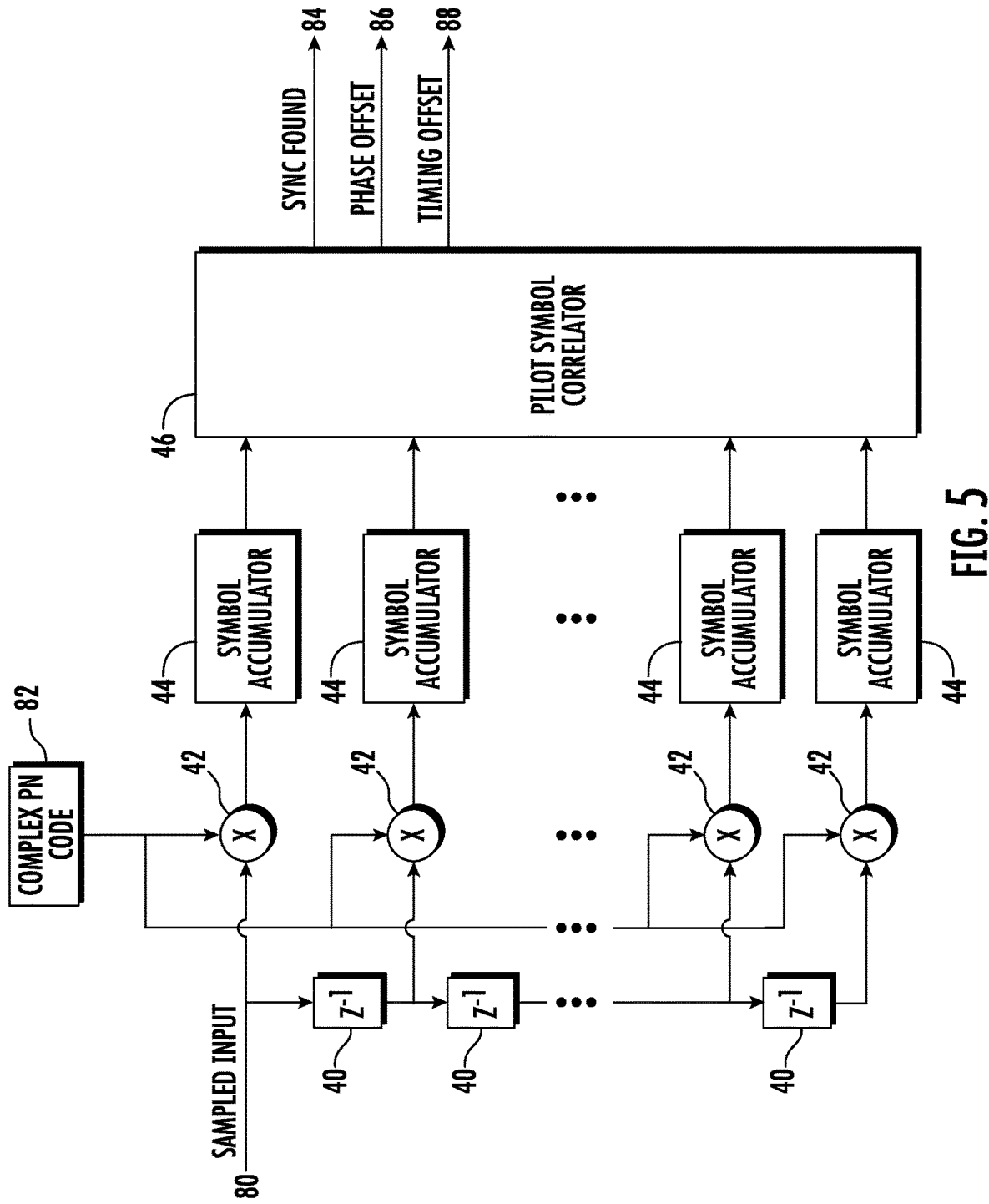
FIG. 5 is a block diagram of functional components used in the RF nodes in the RF communications system of FIG. 1.

There now follows a more detailed technical description of the operation of the various components illustrated in FIG. 5.

The sampled input signal 80 is a complex signal, i.e., having real and imaginary values, for the baseband data stream containing the sequence of pilot symbols 64 spread with the complex spreading code sequence as a complex PN code. Some of the signal is delayed at the data delay blocks 40 and mixed with the complex PN code from the code generator circuit 82 and input into the plurality of multipliers 42 downstream from the plurality of data delay blocks. This sampled input may include noise that is suppressed by the despreading process.

The starting position of the spread pilot sequence with the sampled input 80 is known to be within N samples, but the exact position is not known. This ambiguity is due to varying RF group delay as a receive carrier shift from one frequency to another. The despreading is performed on the input signal for each of the N sample delays and creates a set of N despread symbol sequences. After mixing within the multipliers 42, the output from each multiplier is accumulated within symbol accumulators 44. The pilot symbol correlator 46 detects the symbol sequence with one of the N sequences being a stronger sequence than the others. This is a binning or channelized approach where N hypothesized timing offsets are tested and compared.

A local copy of this spread symbol sequence is output as a stream from the complex PN code generator circuit 82. The data delay blocks ($Z^{-1}$) 40, multipliers 42, and symbol accumulators 44 perform the estimated discrete cross-correlation function. In this example, each of N symbol accumulators 44 outputs one sample of the cross-correlation function. All samples are created at the same time in parallel. These N outputs represent one of the pilot symbols after despreading at different sample offsets. This process repeats in time until all the pilot symbols are input to the pilot symbol correlator 46.

The pilot symbol correlator 46 also performs a cross-correlation function to find the pilot symbol sequence. In this example, the correlation is at the symbol level and correlation results are created sequentially. The pilot symbol correlator 46 performs this cross-correlation on N symbol sequences and looks for a maximum magnitude (peak) among the N symbol sequences. If this maximum is above some threshold, the pilot symbol correlator 46 signals that the code sequence was found with an output as the "Sync Found" output signal 84. Other properties of this peak are also calculated.

One property relates the angle, i.e., the arctangent of the complex, real and imaginary peaks. This measurement relates the relative carrier phase to the incoming signal. This angle is output as "Phase Offset" output signal 86.

Another property is the location of the peak within the N symbol streams. In the sampled data, the spreading code sequence may have some sampling offset in time and may be between samples. This offset is determined by looking at the peak symbol correlation magnitude along with the magnitude of one or more adjacent correlation samples. This "Timing Offset" output signal 88 conveys the position of this peak along with a fractional sample offset.

Based on these outputs for the Sync Found output signal 84 for the desired despreading sequence, the phase offset output signal 86 and the timing offset output signal 88, the incoming signal is adjusted. The symbol processing continues based on the desired despreading sequence, phase offset, and timing offset. The processing may be digitally resampled to remove fractional sample delay, and the symbol samples may be rotated on the complex plane to remove the phase offset.

Figure 6:
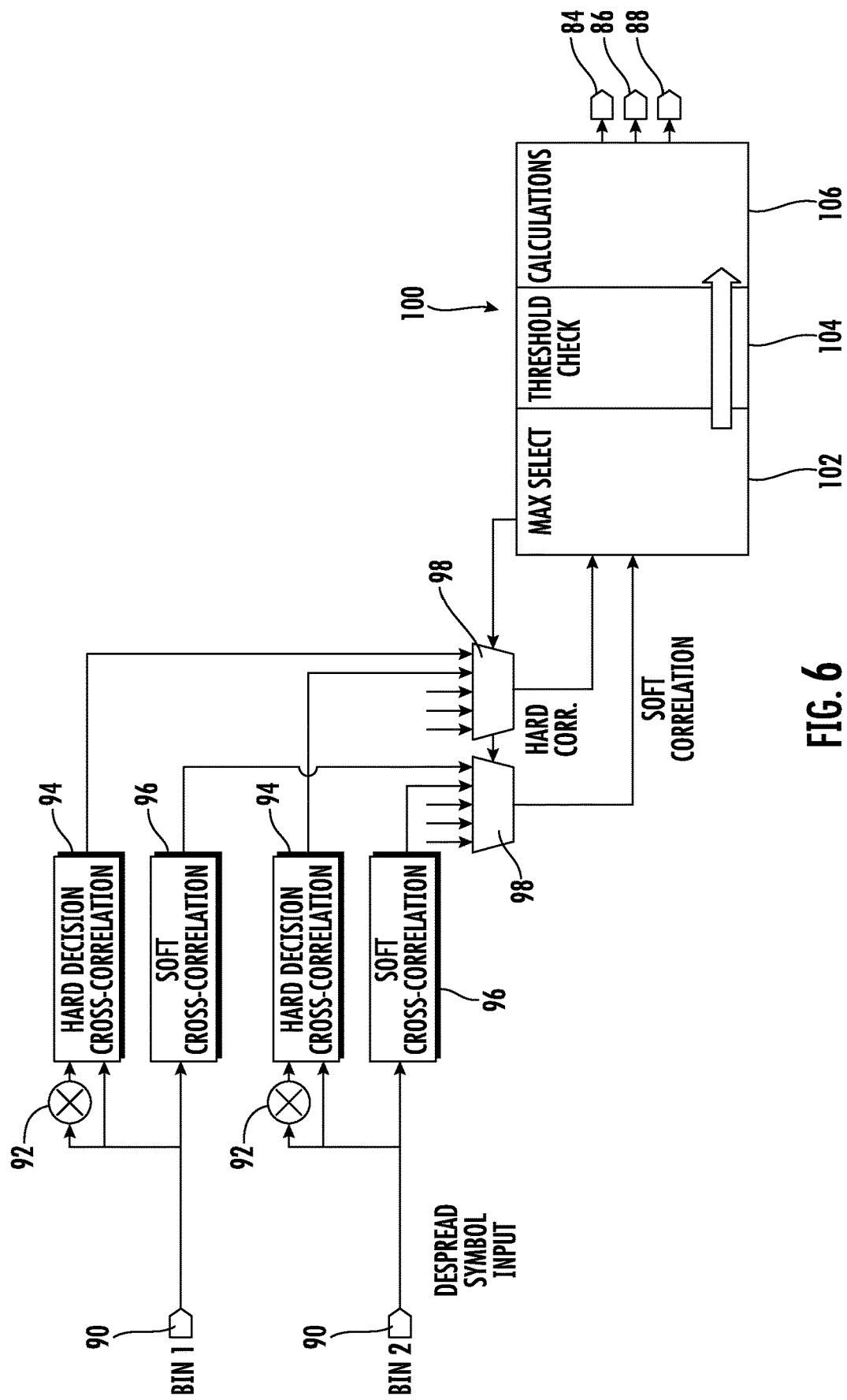
FIG. 6 is another high-level block diagram of the functional components used in the RF communications system of FIG. 1 adapted for use with an acquisition channel.

Referring now to FIG. 6, there is illustrated a high-level block diagram of functional components for a circuit adapted especially for the case when pilot symbols 64 are transmitted on the acquisition channel 68 as part of the acquisition block 72. The pilot symbols 64 are input as before and despread and referred to as a despread symbol input 90, and rotated 45 degrees in this example in a rotator 92 for each despread input. Part of the despread symbol input 90 is not rotated, but both are hard decision cross-correlated by a hard decision cross-correlator 94 and soft cross-correlated within a soft decision cross-correlator 96, followed by serializing in a plurality of serializers 98. These functional components operate similar in function to the data delay blocks 40, multipliers 42, symbol accumulators 44, and complex PN code generator circuit 82 of FIG. 5. The serializers 98 operate on both the hard correlation results and soft correlation results.

A processing circuit 100 operates similar in function to the pilot symbol correlator 46 of FIG. 5 and includes a Maximum Select Module 102 that calculates the magnitude among the soft correlation bins and selects the maximum bin and largest adjacent bin. A Threshold Check Module 104 uses the maximum bin to compare hard correlators to a threshold. The final processing occurs at a Calculation Module 106, and if a threshold level is met, then the maximum is used. An adjacent bin is used to calculate offsets and the outputs are the sync found output signal 84, phase offset output signal 86 and timing offset output signal 88 similar as in the circuit of FIG. 5.

This circuit as described with reference to FIG. 6 may be used with a frequency agile Direct Sequence Spread Spectrum (DSSS) receiver such as part of the second RF transceiver 32 at the second RF node 30 when receiving transmitted signals from the first RF node 22. In this example, an acquisition channel 68 conveys the acquisition block 72 having data to acquire the data channel 70. This acquisition data carried in the acquisition block 72 may include the center carrier frequency, chipping rate, spreading code phase, and similar information. Other characteristics of the data channel 70 may be more difficult to convey. This may include unknown amplitudes on the data channel 70. The location of the synchronization pilot symbols 64 within the data may also be unknown because the data channel 70 contains symbol structures with dynamic lengths, and the pilot symbols are inserted between these structures.

It can be difficult to predict when the pilot symbol 64 is inserted to be conveyed on the acquisition channel 68. The circuit described in FIG. 6 with its processing circuit 100 having its Maximum Select Module 102, Threshold Check Module 104, and Calculation Module 106 searches for pilot symbols with N chips of ambiguity, over thousands of symbols, and with unknown incoming amplitude.

An unknown signal amplitude poses a challenge to a pilot symbol correlator when correlation peaks are compared to an absolute threshold. With a strong input signal containing random symbols, the magnitude of the correlator output can be higher than that of a weak signal containing the pilot symbols 64.

This is a problem that is sometimes addressed by estimating the input signal power and/or the input signal, signal-to-noise ratio. It is sometimes also addressed with a hard-decision approach where the sign of the incoming signal is compared to the pattern of the pilot symbols 64. This removes the amplitude issue. Having to compare the cross-correlation strength between N input bins or channels, however, hampers the hard decision approach. Several of the N bins may produce an output of the same magnitude, and for that reason, the proper channel or bin may not be selected.

The circuit shown in FIG. 6 addresses these difficulties by combining standard cross-correlation referred to as "soft cross-correlation" 96 with hard decision cross-correlation 94. The N different symbol streams as input data are despread by a different offset of the spreading sequence. The block diagram of the circuit in FIG. 6 shows two symbol inputs of N streams 90 as examples, but there may be more. Symbols are represented as complex real and imaginary amplitudes.

The symbols stream is rotated by 45 degrees at respective rotators 92. The hard decision cross-correlation 94 against the known pilot symbol pattern is performed on both the rotated and non-rotated despread pilot symbol streams. This is done independently on the real (in-phase) and imaginary (quadrature) components of both the rotated and non-rotated pilot streams. The result is output as four (real-only) correlation output streams. Applying the 45 degree rotation and the associated processing is a performance enhancement, but it is not required.

Soft cross-correlation 96 is performed on each input pilot symbol stream. The output is a complex correlation stream. Both the resulting "Hard Correlation" and "Soft Correlation" pilot symbol streams are processed. For each pilot symbol in these streams, the soft correlation among the N streams (or bins) is compared and the stream with the maximum is selected. Also, the bins that are adjacent to the maximum bin are compared against each other and the largest of these is selected. When the maximum bin is at the end of this bin structure, then the single adjacent bin is selected by default.

Next, the four hard correlation streams associated with the maximum bin are compared to a threshold. If the threshold is crossed, it indicates that the pilot symbols have been found. Using the standard soft cross correlation stream from the maximum bin and the adjacent bin, the phase offset and timing offsets are calculated and output as the phase offset output signal 86 and timing offset output signal 88. These calculations are the same as described with reference to the circuit shown in FIG. 5 and followed by the subsequent despreading and processing for the data channel 70.

It is possible for the circuit of FIG. 6 to include "half-chip bins" between "full-chip bins" by adding and weighting, and thus, averaging two neighboring bins. Hard decision and soft decision cross-correlations may be performed serially in a loop rather than in parallel. The process of selecting the maximum bin may be done serially. The magnitude and phase offset as the arctangent of the soft cross-correlation 96 may be performed with a Coordinate Rotation Digital Computer (CORDIC). The fraction sample offset may be calculated using the magnitudes from the maximum and the adjacent bins as a second CORDIC-based arctangent function. This may be an approximation and other approximations or interpolation techniques may be used instead.

Figure 7:
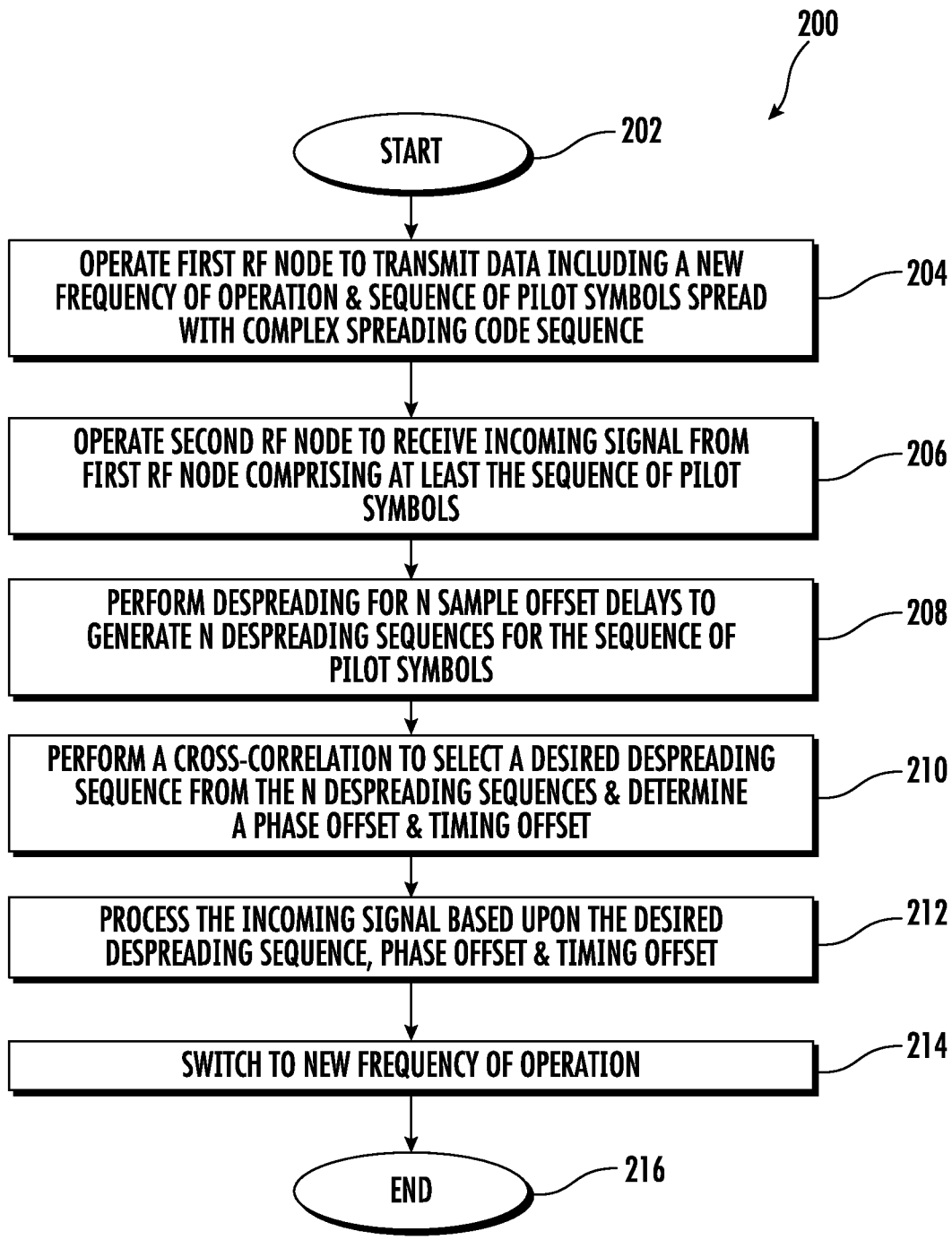
FIG. 7 is a high-level flowchart showing an example of RF communications using the RF communications system shown at FIG. 1.

Referring now to FIG. 7, a high-level flowchart is illustrated at 200 and shows a method of RF communications using the RF communications system 20 illustrated in FIG. 1. The process starts (Block 202) and the first RF node 22 operates to transmit data, including a new frequency of operation, and a sequence of pilot symbols 64 spread with a complex spreading code sequence (Block 204). The second RF node 30 is operated to receive the incoming signal from the first RF node 22 (Block 206) comprising at least the sequence of pilot symbols. The second RF node 30 performs despreading for N sample offset delays to generate N despreading sequences for the sequence of pilot symbols 64 (Block 208). A cross-correlation is performed to select a desired despreading sequence from the N despreading sequences and determine a phase offset and timing offset (Block 210). The incoming signal is processed based upon the desired despreading sequence, phase offset and timing offset (Block 212). The second RF node switches to the new frequency of operation (Block 214). The process ends (Block 216).

The RF communications system 20 as described may be used with a frequency agile system such as the Advanced Tactical Data Link (ATDL) waveform. The acquisition channel 68 may operate as a contention channel and may carry the acquisition block 72 and repeat at a rate slower than a transmission rate of the data blocks 60 and header blocks 62 in the data channel 70.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A radio frequency (RF) communications system comprising:
a first RF node configured to
transmit data including a new frequency of operation, and
transmit a sequence of pilot symbols spread with a spreading code sequence; and
a second RF node configured to
receive an incoming signal from the first RF node comprising at least the sequence of pilot symbols,
perform despreading for N sample offset delays to generate N despreading sequences for the sequence of pilot symbols,
perform a cross-correlation to select a desired despreading sequence from the N despreading sequences, and determine a phase offset and timing offset,
process the incoming signal based upon the desired despreading sequence, phase offset and timing offset, and
switch to the new frequency of operation.

2. The RF communications system of claim 1 wherein the first RF node is configured to transmit the new frequency of operation in a header.

3. The RF communications system of claim 1 wherein the incoming signal comprises a complex baseband data stream including the sequence of pilot symbols spread with a complex spreading code sequence.

4. The RF communications system of claim 1 wherein the desired despreading sequence is a strongest despreading sequence from among the N despreading sequences.

5. The RF communications system of claim 4 wherein the second RF node is configured to compare the strongest despreading sequence to a threshold and indicate a synchronization found when above the threshold.

6. The RF communications system of claim 1 wherein a starting position of the sequence of pilot symbols is within N samples.

7. The RF communications system of claim 1 wherein the second RF node comprises:
a plurality of data delay blocks;
a plurality of multipliers downstream from the plurality of data delay blocks; and
a plurality of accumulators downstream from the plurality of multipliers.

8. The RF communications system of claim 7 wherein the second RF node comprises a pilot symbol correlator downstream from the plurality of accumulators.

9. The RF communications system of claim 8 wherein the pilot symbol correlator is configured to perform cross-correlation on N symbol sequences and determine a maximum magnitude among the N symbol sequences, and when this maximum magnitude is above a threshold, indicate the code sequence was found.

10. The RF communications system of claim 1 further comprising at least one other RF node defining a mesh network.

11. The RF communications system of claim 1 wherein the first and second RF nodes define a point-to-point communication link.

12. The RF communications system of claim 1 wherein the first RF node is configured to transmit the sequence of pilot symbols at an acquisition channel frequency different than a data channel frequency for the data.

13. A radio frequency (RF) communications system comprising:
a first RF node configured to
transmit data including a new frequency of operation, and
transmit a sequence of pilot symbols spread with a spreading code sequence; and
a second RF node configured to
receive an incoming signal from the first RF node comprising at least the sequence of pilot symbols,
perform despreading for N sample offset delays to generate N despreading sequences for the sequence of pilot symbols, a starting position of the sequence of pilot symbols being within N samples,
perform a cross-correlation to select a strongest despreading sequence from the N despreading sequences, and determine a phase offset and timing offset,
process the incoming signal based upon the strongest despreading sequence, phase offset and timing offset, and
switch to the new frequency of operation.

14. The RF communications system of claim 13 wherein the first RF node is configured to transmit the new frequency of operation in a header.

15. The RF communications system of claim 13 wherein the incoming signal comprises a complex baseband data stream including the sequence of pilot symbols spread with a complex spreading code sequence.

16. The RF communications system of claim 13 wherein the second RF node is configured to compare the strongest despreading sequence to a threshold and indicate a synchronization found when above the threshold.

17. The RF communications system of claim 13 wherein the second RF node comprises:
a plurality of data delay blocks;
a plurality of multipliers downstream from the plurality of data delay blocks; and
a plurality of accumulators downstream from the plurality of multipliers.

18. The RF communications system of claim 17 wherein the second RF node comprises a pilot symbol correlator downstream from the plurality of accumulators.

19. The RF communications system of claim 18 wherein the pilot symbol correlator is configured to perform cross-correlation on N symbol sequences and determine a maximum magnitude among the N symbol sequences, and when this maximum is above a threshold, indicate the code sequence was found.

20. The RF communications system of claim 13 further comprising at least one other RF node defining a mesh network.

21. The RF communications system of claim 13 wherein the first and second RF nodes define a point-to-point communication link.

22. The RF communications system of claim 13 wherein the first RF node is configured to transmit the sequence of pilot symbols at an acquisition channel frequency different than a data channel frequency for the data.

23. A method of radio frequency (RF) communications comprising:
operating a first RF node to
transmit data including a new frequency of operation, and
transmit a sequence of pilot symbols spread with a spreading code sequence; and operating a second RF node to
  receive an incoming signal from the first RF node comprising at least the sequence of pilot symbols,
  perform despreading for N sample offset delays to generate N despreading sequences for the sequence of pilot symbols,
  perform a cross-correlation to select a desired despreading sequence from the N despreading sequences, and determine a phase offset and timing offset,
  process the incoming signal based upon the desired despreading sequence, phase offset and timing offset, and
  switch to the new frequency of operation.

24. The method of claim 23 wherein the first RF node is operated to transmit the new frequency of operation in a header.

25. The method of claim 23 wherein the incoming signal comprises a complex baseband data stream including the sequence of pilot symbols spread with a complex spreading code sequence.

26. The method of claim 23 wherein the desired despreading sequence is a strongest despreading sequence from among the N despreading sequences.

27. The method of claim 26 wherein the second RF node is operated to compare the strongest despreading sequence to a threshold and indicate a synchronization found if above the threshold.

28. The method of claim 23 wherein a starting position of the sequence of pilot symbols is within N samples.

29. The method of claim 23 comprising operating at least one other RF node defining a mesh network.

30. The method of claim 23 wherein the first and second RF nodes define a point-to-point communication link.

31. The method of claim 23 wherein operating the first RF node comprises operating the first RF node to transmit the sequence of pilot symbols at an acquisition channel frequency different than a data channel frequency for the data.

* * * * *